United States Patent

[11] 3,609,511

| [72] | Inventor | Robert L. Risberg |
| | | Milwaukee, Wis. |
| [21] | Appl. No. | 867,740 |
| [22] | Filed | Oct. 20, 1969 |
| [45] | Patented | Sept. 28, 1971 |
| [73] | Assignee | Cutter-Hammer, Inc. |
| | | Milwaukee, Wis. |

[54] ELECTRONIC INVERTER HAVING PRECHARGING CONTROL AFFORDING HIGH FREQUENCY SWITCHING AT LOW OUTPUT
9 Claims, 2 Drawing Figs.

[52] U.S. Cl. .................................................. 321/45 R, 321/45 C, 321/45 ER
[51] Int. Cl. ............................................. H02m 7/48
[50] Field of Search ...................................... 321/45, 44, 45 C, 45 ER

[56] References Cited
UNITED STATES PATENTS
| 3,349,315 | 10/1967 | Studtmann ............... | 321/45 |
| 3,355,654 | 11/1967 | Risberg .................... | 321/44 |
| 3,405,346 | 10/1968 | Krauthamer ............. | 321/45 |
| 3,504,266 | 3/1970 | Schlabach et al. ....... | 321/45 X |

Primary Examiner—William M. Shoop, Jr.
Attorney—Hugh R. Rather

ABSTRACT: A single or plural phase solid state inverter having a half bridge for each phase and each half bridge including a pair of power semiconductor controlled rectifiers for switching, inductance-capacitance circuits for commutation of the power SCR's, a separate and electrically isolated precharging supply for each phase, and a pair of voltage level detectors of the solid state type that allow use of the commutating energy in one part of the half bridge for charging the commutating capacitor to the required voltage level in the other part of the half bridge, above which the level detector becomes operative to allow feedback of the remaining energy to the supply, thereby to afford relatively high frequency switching in the inverter at low output voltages in an efficient manner.

ELECTRONIC INVERTER HAVING PRECHARGING CONTROL AFFORDING HIGH FREQUENCY SWITCHING AT LOW OUTPUT

BACKGROUND OF THE INVENTION

Electronic inverters having a separate and electrically isolated precharging supply for each phase have been known heretofore as shown in R. L. Risberg U.S. Pat No. 3,355,654, dated Nov. 28, 1967. While inverters of this type have been useful for their intended purposes, it has been found desirable to use these inverters in high power applications where a large current at low voltage is required and where the frequency is held constant at a relatively high value such as 200 Hz. or where the frequency is variable. One such application is in resistance tube welding. Another application is in adjustable frequency motor drives. Under such conditions, the low bus voltage would allow, prior to this invention, a large part of the commutating energy to be fed back after each commutating action into the power bus. Consequently, a rather large size precharging circuit including a large capacity transformer was required to precharge the commutating capacitors to the high voltage value to enable high frequency switching to be performed.

The present invention is an improvement thereon.

SUMMARY OF THE INVENTION

This invention relates to improvements over prior electronic inverter systems whereby under conditions of constant high frequency or variable frequency, high output current and low output voltage, the system affords higher efficiency, a smaller precharge power supply and better current utilization of the power semiconductor controlled rectifiers (SCR's).

An object of the invention is to provide an improved electronic inverter system.

A more specific object of the invention is to provide an improved electronic inverter system especially adapted for efficient operation at high output current, high frequency and low voltage, as well as at other values of current, frequency and voltage.

Another specific object of the invention is to provide an improved electronic inverter system operable at high frequency and low output voltage whereby the size requirements of the precharge power supply circuit are reduced.

Another specific object of the invention is to provide an electronic inverter system with an improved recouping circuit whereby it becomes especially adapted for use in tube welding systems.

Another specific of the invention is to provide an improved inverter system wherein efficient utilization of power thyristors and associated components is obtained at high frequency and low voltage.

Other objects and advantages of the invention will hereinafter appear.

DESCRIPTION OF THE PREFERRED EMBODIMENT

Figure 1A:
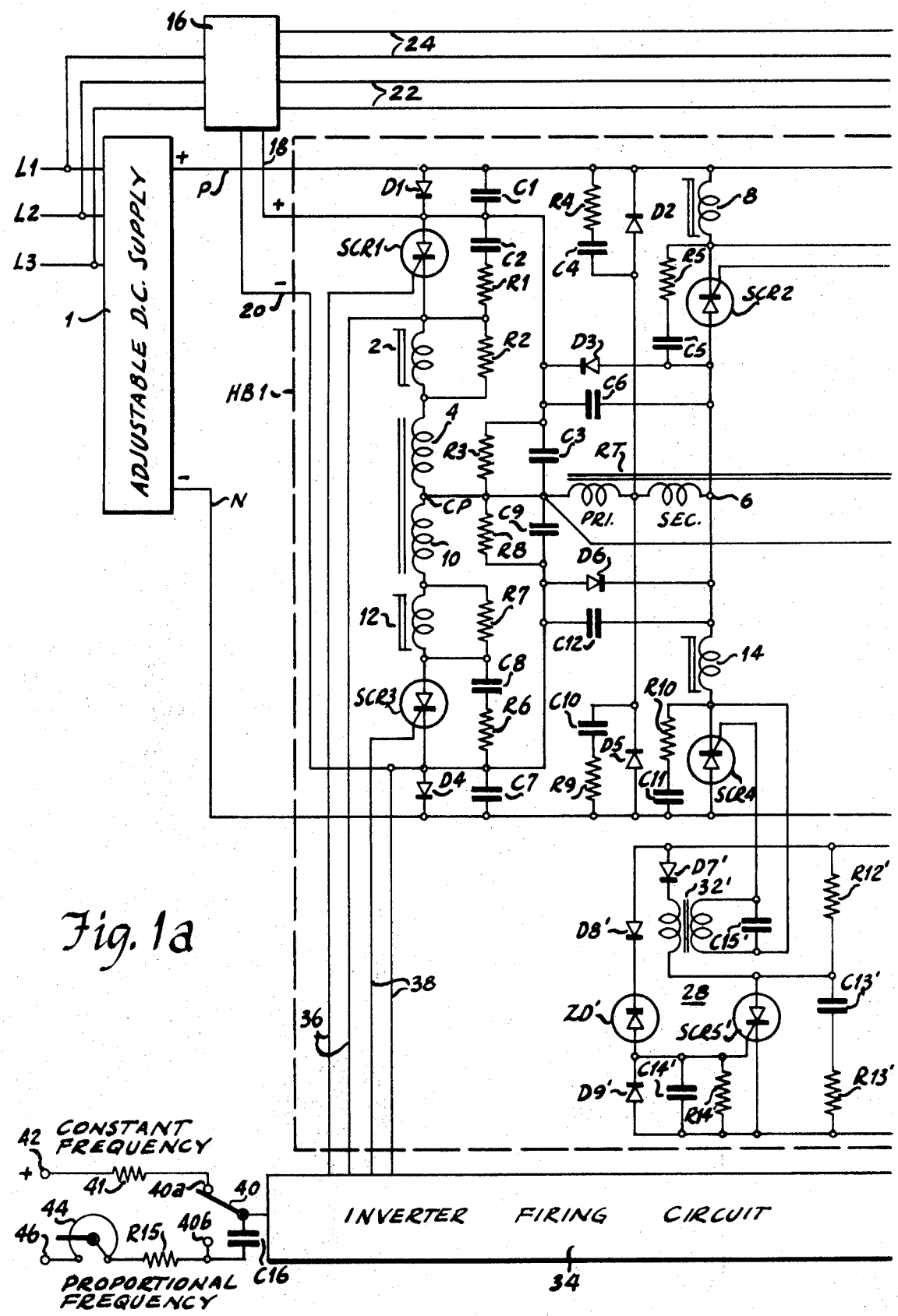
FIGS. 1a and 1b show a circuit diagram of an electronic inverter system constructed in accordance with the invention.

Referring to the drawing, there is shown an inverter system of the three-phase type having three half-bridges HB1, HB2 and HB3. However, it will be apparent that a one or two phase system would be similar except that a different number of bridges would be used. Since the three half-bridges are similar, only half-bridge HB1 has been shown in detail and half-bridges HB2 and HB3 are shown schematically.

These three half-bridges of the inverter are supplied in common from positive and negative DC buses P and N. These are the output buses of an adjustable DC supply circuit 1 powered from a three-phase AC source through power supply lines L1, L2 and L3.

This adjustable DC supply circuit receives alternating current and provides adjustable voltage direct current. For this purpose, the adjustable DC supply circuit may comprise a controlled rectifier bridge of the SCR type or the like and a filter. By controlling the firing angle of the controlled rectifiers therein, the magnitude of the DC bus voltage may be adjusted. Another way of obtaining adjustable DC voltage is with an uncontrolled rectifier bridge followed by a chopper and a filter. By controlling the chopper "on" periods, the magnitude of the DC bus voltage may be adjustable.

As shown in the drawing, half-bridge HB1 comprises an upper power circuit extending from positive bus P to output terminal T1 and a lower power circuit extending from output terminal T1 to negative bus N. Current flows in one direction in the upper power circuit and flows in the other direction, relative to the output terminal, in the lower power circuit. Thus, if current flows in the upper power circuit, it will flow out of output terminal T1, through the load and then into terminal T2 and through the lower power circuit flows in the next half-bridge to negative bus N. And if current flows in the lower power circuit, it will first flow from positive bus P through the upper power circuit in another half-bridge, through the load and then into terminal T1 and through the lower power circuit to negative bus N. It may be regarded as if the positive half-cycle of square wave current flows through the upper power circuit into the load and the negative half-cylce of square wave current flows from the load through the lower power circuit.

The upper power circuit of half-bridge HB1 comprises a blocking diode D1 connected in its forward low impedance direction from positive bus P through the anode and cathode of a semiconductor controlled rectifier SCR1, a protecting inductor 2 and a commutating inductor 12 to a center point CP that is connected to output terminal T1. A transient suppression capacitor C1 is connected across diode D1. A capacitor C2 and a resistor R1 are connected in series across SCR1 to slow down the rate of change of voltage across the SCR and to absorb recovery transients. A bypass current resistor R2 is connected across inductor 2. A bleeder resistor R3 and a commutating capacitor C3 are connected in parallel between the anode of SCR1 and center point CP, that is, across SCR1 and inductors 2 and 4. Center point CP is connected through the first part of the winding (primary) and the second part of the winding (secondary) of a recoup transformer RT to a junction 6, these windings having a turns ratio of at least 1 to 3.

The junction between the primary and secondary windings PR1 and SEC is connected through a feedback diode D2 to positive bus P. A transient absorbing resistor R4 and capacitor C4 are connected in series across diode D2.

Junction 6 is connected through the anode and cathode of a feedback silicon controlled rectifier SCR2 and a transient suppressing inductor 8 to positive bus P. A capacitor C5 and a resistor R5 are connected in series across SCR2 to slow down the rate of change of voltage across the SCR and to absorb recovery transients.

A precharging current conducting diode D3 is connected from junction 6 to the upper side of commutating capacitor C3 so as to connect the cummutating capacitor in a unidirectional loop with the primary and secondary windings of the recoup transformer. A transient suppression capacitor C6 is connected across diode D3.

The lower power circuit of half-bridge HB1 is similar to the upper one just described except that the components are arranged in the reverse order with respect to the bus voltage polarity. That is, center point CP, which may be a center tap on a single commutating inductor, is connected through commutating inductor 10, protecting inductor 12, SCR3 and diode D4 to negative bus N. A transient suppression capacitor C7 is connected across diode D4. A capacitor C8 and a resistor R6 are connected in series across SCR3 for the same purpose as like elements in the upper part. A bypass current resistor R7 is connected across inductor 12. A bleeder resistor R8 and a commutating capacitor C9 are connected in parallel between the cathode of SCR3 and center point CP, that is, across SCR3 and inductors 10 and 12.

Negative bus N is connected through a feedback diode D5 in its forward low impedance direction to the junction between primary and secondary windings PRI and SEC. A transient absorbing resistor R9 and capacitor C10 are connected in series across diode D5.

Negative bus N is connected through the anode and cathode of feedback SCR4 and a transient suppressing inductor 14 to junction 6. A capacitor C11 and a resistor R10 are connected in series across SCR4 to slow down the rate of change of voltage across the SCR and to absorb recovery transients.

A precharging current conducting diode D6 is connected from the lower side of commutating capacitor C9 to junction 6 so as to connect the commutating capacitor in a unidirectional loop with the primary and secondary windings of the recoup transformer. This transformer gets its name from functioning to recoup the energy that is stored in the commutating capacitors by using this energy to charge the other commutating capacitor and feeding back the remainder of such energy into the filter capacitor of the DC supply circuit. A transient suppression capacitor C12 is connected across diode D6.

Inductors 2 and 12 in the inverter are ferrite core inductors for rate of change of current ($di/dt$) protection of the associated SCR's. These inductors are saturating reactors provided with individual cores of square hysteresis loop material and provide their protective functions when the respectively associated SCR's are fired. Without these reactors, the current would jump to the value flowing in the other part of the half-bridge and its rate of change would be limited only by the leakage reactance of the commutating inductance coil. The ferrite inductor allows only a small current to flow, equal to the coercive ampere turns, until the core saturates, thus allowing the SCR to turn fully on before the current increases to the load current level. The ferrite core is reset by a displacement current that flows backwards through the SCR being turned off.

Bypass resistors R2 and R7 are provided in shunt of inductors 2 and 12, respectively, to allow in each case a desired reverse current to flow in the associated SCR to turn it off. When one SCR is turned on and the commutating inductor applies reverse voltage on the other SCR, the ferrite core inductor allows only a very small reverse current to flow in the associated SCR. To increase this reverse current to an optimum value to insure turnoff of the SCR, a resistor such as R2 is placed across the ferrite core inductor to bypass reverse current.

A separate and electrically isolated precharging voltage supply is provided for each half-bridge for precharging the commutating capacitors therein. For this purpose, power supply lines L1, L2 and L3 are connected to the input side of a three-phase transformer-rectifier circuit 16 shown at the upper left-hand portion of FIG. 1a. This circuit may be provided with one three-phase primary winding and three three-phase secondary windings and three rectifier bridges, there being one such secondary winding and rectifier bridge for each half-bridge of the inverter. The positive output terminal of the first rectifier bridge is connected through conductor 18 to the junction between diode D1 and the anode of SCR1. The negative output terminal thereof is connected through conductor 20 to the junction between the cathode of SCR 2 and diode D4. In a similar manner, conductor pairs 22 and 24 connect the output terminals of the second and third rectifier bridges in circuit 16 to half-bridges HB2 and HB3, respectively. As will be apparent, the three secondary windings provide separate and electrically isolated supplies for the respective half-bridges for precharging the commutating capacitors therein as hereinafter more fully described.

A pair of voltage level detectors are provided for each half-bridge for controlling the feedback SCR's therein. For this purpose, half-bridge HB1 is provided with level detectors 26 and 28 for controlling feedback SCR2 and SCR4, respectively. Since the level detectors in half-bridges HB2 and HB3 are similar, the details thereof have not been shown to avoid complicating the drawing.

Figure 1B:
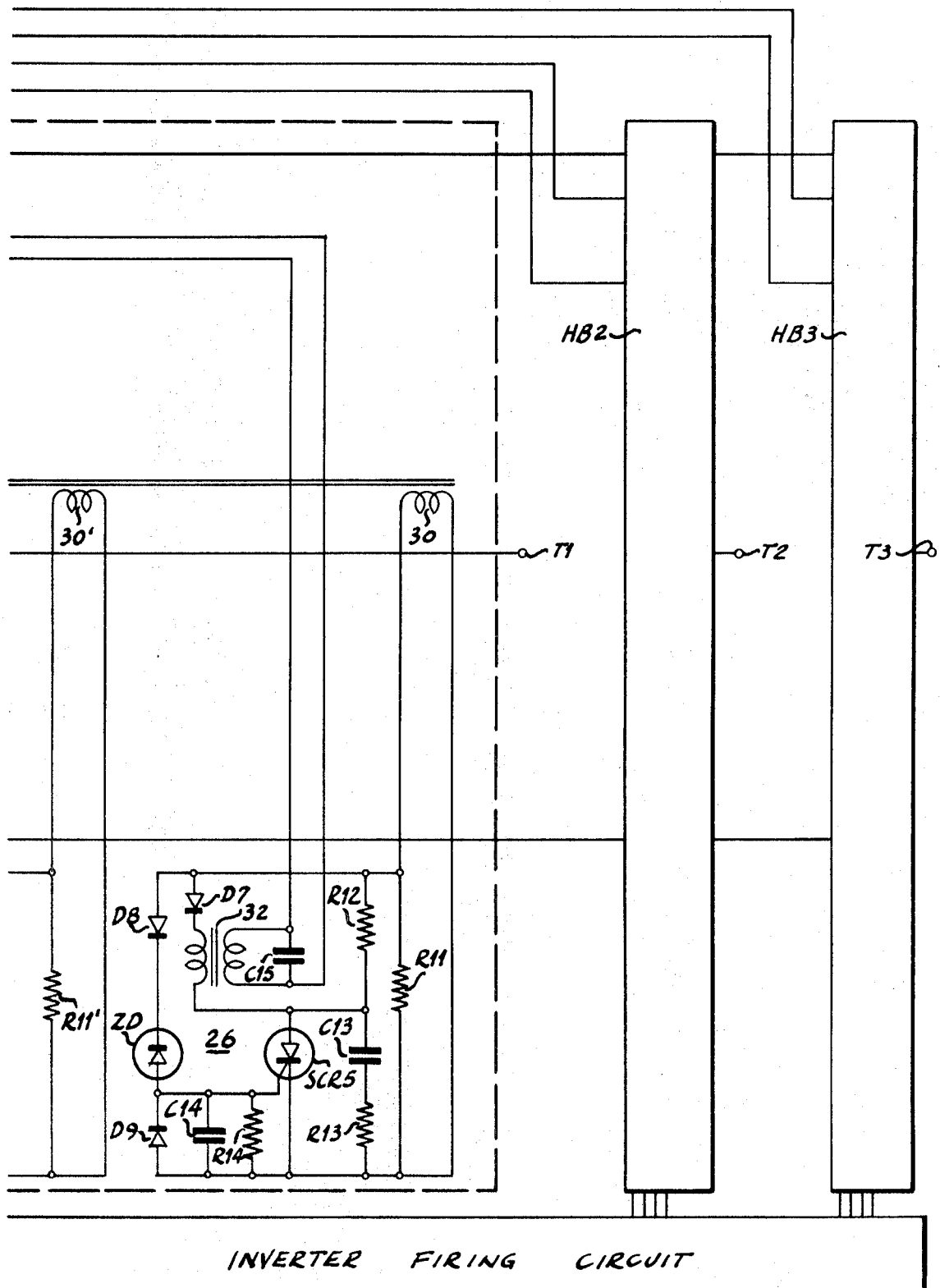

As shown in FIG. 1b, level detector circuit 26 is supplied from a control winding 30 coupled to the magnetic core of recoup transformer RT. This control winding is connected across a resistor R11. The upper end of this resistor is connected through a unidirectional diode D7, the primary winding of a firing transformer 32 and the anode and cathode of SCR5 to the lower end of resistor R11. A resistor R11 is connected across diode D7 and the primary of the firing transformer to provide a current path in shunt thereof. A capacitor C13 and a resistor R13 are connected in series across SCR5 to slow down the rate of change of voltage across the SCR and to absorb transients.

A spillover firing control circuit extends from the upper end of resistor R11 through a unidirectional diode D8, a zener diode ZD and the gate and cathode of SCR5 to the lower end of resistor R11. A resistor R14 and a capacitor C14 are connected between the gate and cathode of SCR5, the capacitor absorbing transients to prevent inadvertent firing of the SCR and the resistor providing a discharge path for the capacitor. A unidirectional diode D9 is connected from the cathode to the gate of SCR5 to prevent capacitor C14 from charging in the opposite direction. The secondary winding of firing transformer 32 is connected across the gate and cathode of feedback SCR2. A transient absorbing capacitor C15 is connected across this secondary winding.

Voltage level detector circuit 28 is like that just described and the elements thereof are identified by similar reference characters with the addition of a prime. The only difference is that the secondary winding of firing transformer 32' is connected across the gate and cathode of the other feedback SCR4.

Power circuit rectifiers SCR1 and SCR3 are controlled by an inverter firing circuit 34 shown at the lower portion of the drawing. This firing circuit is connected by two pairs of conductors 36 and 38 to the gate-cathode circuits of SCR1 and SCR3, respectively, for supplying firing pulses of current thereto. In a similar manner, firing circuit 34 is connected by two pairs of conductors to half-bridge HB2 and two additional pairs of conductors to half-bridge HB3 for supplying firing pulses to the power control SCR's therein as shown in FIG. 1b.

At the lower left-hand portion of FIG. 1a, a switch 40 is provided for selecting constant frequency control or proportional frequency control of the inverter. Switch 40 is provided with a movable contact and a first stationary contact 40a connected through a resistor 41 and terminal 42 to a positive voltage source, and a second stationary contact 40b connected through a constant resistor R15 and a variable resistor 44 to a terminal 46. A coupling capacitor C16 is connected in shunt of stationary contact 40b and the movable contact of switch 40. Terminal 46 may be connected to receive feedback from either positive DC bus P or from the inverter output. In the later case, a transformer and a rectifier would be used to apply DC voltage to terminal 46 proportional to the output voltage.

Since inverter firing circuits for controlling off plural-phase inverters including the three-phase inverter illustrated and inverter firing circuits for controlling of single phase inverters are well known in the art, the details thereof have not been shown to avoid complicating the drawing.

OPERATION

When power is connected and adjustable DC supply circuit 1 applies a voltage across buses P and N, current flows through diode D1, commutating capacitors C3 and C9 and diode D4. This causes each commutating capacitor to be charged to one-half of the bus voltage.

Current also flows from precharging transformer-rectifier circuit 16 through conductor 18, capacitors C3 and C9 and conductor 20 to charge the commutating capacitors to a higher voltage. Whenever the voltage on the commutating capacitors becomes higher than the bus voltage, diodes D1 and D4 block discharge of these capacitors into the supply buses.

Assuming that SCR1 is fired into conduction first, current flows from the positive bus through diode D1, SCR1, inductors 2 and 4 and output terminal T1 to the load. This current flows from the load through the lower portion of another half-bridge HB2 or HB3 to the negative bus. This means that in a three-phase system as shown, the six power SCR's are fired in a predetermined sequence.

This current flow prepares commutating conditions for SCR1 to enable it to be turned off when SCR3 is fired. For this purpose, the current flowing through SCR1 charges commutating capacitor C9 to the bus voltage. Also the precharging circuit 16 supplies current through SCR1 to charge capacitor C9 to the predetermined commutating voltage which may be above bus voltage.

Now when SCR3 is fired into conduction, capacitor C9 commutates SCR1 off. To this end, when SCR3 is rendered conducting, capacitor C9 discharges through inductors 10 and 12 and through SCR3. The current flowing in inductor 10 includes a voltage in inductor 4 due to the common core coupling therebetween and this voltage reverses biases SCR1 to turn it off.

With SCR3 turned on and SCR1 turned off, current now flows from output terminal T1 through inductors 10 and 12, SCR3 and diode D4 to bus N. This current flows to the load from bus P through the upper portion of one of the other two half-bridges.

When commutating capacitor C9 discharged as aforesaid, its energy was transferred to inductor 10. Following turnoff of SCR1, capacitor C3 charged to the bus voltage in a circuit extending through diode D1, capacitor C3, inductors 10 and 12, SCR3 and diode D4. Inductor 10 now becomes a source of voltage and begins to charge capacitor C9 in the opposite direction by current flow through inductor 12 and SCR3. Also, this inductor 10 source causes a heavy current to flow through primary PRI of the recoup transformer. This circuit extends through inductor 12, SCR3, diodes D4 and D5 and the transformer primary. The primary induces a higher voltage in secondary SEC. These primary and secondary voltages cause current to flow through junction 6, diode D3 and capacitor C3 to charge the latter to a higher voltage, that is, to the predetermined commutating voltage.

When this predetermined voltage is reached on capacitor C3, feedback SCR2 is fired to feed back any remaining energy to the filter capacitor in adjustable DC supply circuit 1. In general for inductive loads, a value of load ampere-turns will exist in the commutating inductor before commutation. After commutation, the inductor energy consists of the commutating capacitor discharge energy in addition to the load contributed initial energy. Thus in general, more energy is contained in the inductor than is required to charge the opposite commutating capacitor. For this purpose, control winding 30 in FIG. 1b has a voltage proportional to that being used to charge capacitor C3 since it is magnetically coupled to the recoup transformer. Winding 30 applies its voltage across zener diode ZD in voltage level detector circuit 26. When the aforesaid predetermined commutating voltage on capacitor C3 is reached, zener diode ZD spills over, allowing current flow from winding 30 through diode D8, zener diode ZD and the gate-cathode circuit of SCR5 to fire the latter into conduction.

As a result, current flows from winding 30 through diode D7, primary winding of transformer 32 and SCR5. This causes a current pulse to be applied from the secondary winding of transformer 32 to the gate-cathode circuit of feedback SCR2 to fire the latter into conduction. As a result, the current that was flowing through diode D3 to charge capacitor C3 is now diverted through SCR2, inductor 8 and positive bus P to the filter capacitor in adjustable DC supply circuit 1. The return path for this current is through negative bus N and diode D5 to the left end of secondary SEC.

From the foregoing, it will be apparent that the electrical energy that was stored in commutating capacitor C9 for the primary purpose of turning SCR1 off upon the firing of SCR3 has now been used additionally to charge commutating capacitor C3 to the required level, instead of wasting this energy by dissipating it in a resistor or returning it to the bus and having to precharge with 50 percent efficiency. This becomes particularly useful at low bus voltage operation wherein a large amount of energy must be supplied from the precharging circuit 16 to recharge the commutating capacitors for high frequency switching, requiring a large transformer therein, unless the energy already in one commutating capacitor is reusable as herein. Thus, the invention reduces the size of the precharging transformer that is required. This is particularly significant in high power applications, viz. 150 kw. loads and above.

When SCR1 is next fired into conduction, the circuit operates in a similar manner. Capacitor C3 discharges through SCR1 and inductors 2 and 4. The voltage induced in inductor 10 reverse biases SCR3 to turn it off. When capacitor C3 has discharged, inductor 4 becomes a voltage source and charges capacitor C3 in the reverse direction and causes a heavy current to flow through primary PRI of the recoup transformer, diode D2, bus P, diode D1, SCR1 and inductor 2. In the meantime, with SCR1 turned on and SCR3 turned off, capacitor C9 charges to the bus voltage by current flow through diode D1, SCR1, inductors 2 and 4, capacitor C9 and diode D4. The heavy current in the primary induces a stepped-up voltage in secondary SEC of the recoup transformer causing current flow through diode D6 to charge capacitor C9 to the aforementioned predetermined voltage required for proper commutation.

When this predetermined voltage has been reached on capacitor C9, feedback SCR4 is fired to feed back any remaining stored energy to the filter capacitor in supply circuit 1. To this end, winding 30' in FIG. 1b applies a voltage to cause zener diode ZD' to spill over, allowing current flow into the gate of SCR5' to fire it into conduction. As a result, transformer 32' fires SCR4 into conduction. This causes the current that was flowing from secondary SEC through primary PRI into capacitor C9 to be diverted through diode D2 and positive bus P into the filter capacitor in supply circuit 1. The return path is through negative bus N, SCR4, inductor 14 and junction 6 to secondary SEC.

There is an additional advantage in the recouping of commutating energy just described. The rate of decay of current through the commutating inductor winding and associated SCR occurs at a much faster rate at low DC bus voltages than has heretofore been the case in conventional recoup circuits where SCR2 and SCR4 are merely diodes and diodes D3 and D6 and their associated transient suppression are not used.

Heretofore, the rate of delay of the commutating current has been inversely proportional to the DC bus voltage times the recoup transformer primary-secondary turns ratio. Therefore, at low DC bus voltages the decay time is correspondingly along whereas in the invention the rate of decay is proportional to the voltage on the capacitor times the recoup transformer primary-secondary turns ratio prior to the gating of the feedback SCR a much higher rate.

For example, at 30 volts bus voltage, the decay time with the invention is less than one-tenth what it would be in the conventional circuit. Consequently, a switching rate time times as high could be used at this low output voltage.

When the inverter firing circuit is to be operated at constant frequency, switch 40 is left in the operating position on contact 40a in which it is shown. Thus, a constant DC potential is connected to the firing circuit for constant frequency setting of firing of the inverter SCR's. To maintain constant volt-seconds per half-cycle in the inverter output as is desired to avoid certain unwanted effects, any variation in the inverter output voltage or in the voltage on the DC bus, depending upon which one is coupled to terminal 46, is fed back through the RC coupling comprising resistors 44 and R15 and capacitor C16. This variation is superimposed on the constant DC potential that is the steady state frequency reference. This RC coupling regulates to provide equal volt-seconds per half-cycle in the inverter output.

For proportional frequency operation, switch 40 is moved to its contact 40b. In this position, the inverter output voltage or the DC bus voltage, depending upon the connection to terminal 46, is direct coupled to inverter firing circuit 34 so that the frequency is controlled proportional to the voltage. In this position, switch 40 shunts capacitor C16 so that it has no effect. With all of resistor 44 in circuit, the two resistors 44 and R15 establish the minimum frequency to voltage proportionality curve. The slope of this curve can be increased by removing some of resistance 44.

While a plural-phase inverter system has been shown, the invention is also applicable to a single-phase inverter system. For example, if two half-bridges are used in a single-phase system, the upper power SCR in the first half-bridge and the lower power SCR in the second half-bridge are fired at the same time for one half-cycle of output. Then the lower power SCR in the first half-bridge and the upper power SCR in the second half-bridge are fired simultaneously for the other half-cycle of output. From this it will be apparent that only two voltage level detector circuits such as 26 are required, having two secondary windings on each firing transformer 32 cross-coupled to the half-bridges for firing the respectively associated feedback SCR's. On the other hand, in a three-phase system as shown, two voltage level detector circuits are required for each half-bridge, a total of six, since the power SCR's are fired at different times.

I claim

1. In an electronic inverter system, the combination comprising:

two power switching circuits joined together and supplied from an adjustable direct current source and connected at their junction to an output terminal for supplying alternating current to a load device.

each said power switching circuit comprising an electronic gate controlled power switching device and a commutating inductor in series and a commutating capacitor in parallel therewith and a blocking diode between such parallel circuit and the associated side of the adjustable direct current source for blocking discharge of the commutating capacitors into the latter, the two commutating inductors being magnetically coupled;

a separate precharging direct current source connected across the commutating capacitors of the two power switching circuits for charging them;

a firing circuit for selectively firing said power switching devices into conduction.

each of said commutating capacitors being effective upon firing of the associated power switching device for discharging through the latter and through the associated commutating inductor thereby to induce a voltage in the other commutating inductor to bias its associated power switching device off;

precharging control means comprising a recoup transformer having primary and secondary windings responsive to the energy stored in one of said commutating inductors for charging the commutating capacitor in the other power switching circuit;

and feedback control means operable when said precharging control means has charged said commutating capacitor to a predetermined level for feeding back the remainder of the stored energy into the adjustable direct current source.

2. The invention defined in claim 1, wherein said precharging control means also comprises;

a first unidirectional circuit in which said one commutating inductor causes a current to flow through the primary winding of said recoup transformer;

and a second unidirectional circuit in which the secondary winding of said recoup transformer causes a current to flow to charge the commutating capacitor in said other power switching circuit.

3. The invention defined in claim 1, wherein said feedback control means comprises:

voltage level detector means coupled to said recoup transformer and being responsive to the voltage thereon when said commutating capacitor voltage reaches said predetermined level to provide an operating signal;

and means responsive to said operating signal for completing a feedback path from the secondary winding of said recoup transformer to said adjustable direct current source.

4. The invention defined in claim 3, wherein said voltage level detector means coupled to said recoup transformer comprises:

a pair of control windings on said recoup transformer;

a pair of voltage spillover circuits connected to the respective control windings, each being effective to provide a firing current pulse when the voltage on its control winding exceeds a given value indicative of said predetermined level of charge on the respective commutating capacitor;

and a pair of gate controlled feedback switching devices for completing opposite polarity paths from the secondary winding of said recoup transformer to said adjustable direct current source, said feedback switching devices being controlled by the firing current pulses of the respective voltage spillover circuits.

5. The invention defined in claim 4, wherein each said voltage spillover circuit comprises:

a gate controlled firing pulse switching device;

a zener diode responsive to the voltage on the associated control winding for passing a current to the gate of said firing pulse switching device to render it conducting;

and a firing pulse transformer responsive to conduction of said firing pulse switching device for applying a firing current pulse to the associated feedback switching device.

6. In an electronic inverter having at least one controllable half-bridge including upper and lower power control portions connectable at their junction to a load device; the combination comprising:

an adjustable direct voltage source for supplying operating voltage to the inverter;

each portion of the half-bridge comprising a blocking diode, a controllable electronic power switching device and a commutating inductor in series connection between one side of said source and the load junction, the commutating inductors being magnetically coupled together.

a pair of commutating capacitors connected individually across the power switching device and commutating inductor of each portion of the half-bridge;

a separate precharging direct current source connected across said commutating capacitors;

said blocking diodes being poled to block discharge of said commutating capacitors into said adjustable direct voltages source;

a firing circuit for selectively firing said power switching devices into conduction;

one of said commutating capacitors being effective upon firing of the associated "off" power switching device "on" for discharging through the latter and through the associated first commutating inductor thereby to induce a voltage in the second commutating inductor to bias the associated power switching device off;

a recoup transformer having primary and secondary windings and a pair of control windings;

means comprising said recoup transformer responsive to the energy stored in said first commutating inductor for charging the other commutating capacitor to a predetermined voltage level;

and means comprising a voltage level detector responsive to the voltage on one of said control windings when said other commutating capacitor reaches said predetermined voltage level for feeding back the remaining stored energy from said recoup transformer secondary winding to said adjustable direct voltage source.

7. The invention defined in claim 6, wherein said means comprising said recoup transformer also comprises:

a first unidirectionally conducting circuit wherein said first commutating inductor causes current flow through the primary winding of said recoup transformer.

and a second unidirectionally conducting circuit wherein said primary and secondary windings cause current flow to the other commutating capacitor to charge the same.

8. The invention defined in claim 6, wherein:

said other commutating capacitor is effective upon firing of the associated "off" power switching device "on" for discharging through the latter and through the associated second commutating inductor thereby to induce a voltage in the first commutating inductor to bias the associated power switching device off;

and said combination also comprises:

second means comprising said recoup transformer responsive to the energy stored in said second commutating inductor for charging said one commutating capacitor to said predetermined voltage level;

and means comprising a second voltage level detector responsive to the voltage on the other control winding when said one commutating capacitor reaches said predetermined voltage level for feeding back the remaining stored energy from said recoup transformer secondary winding to said adjustable direct current source.

9. The invention defined in claim 8, wherein said second means comprising said recoup transformer also comprises;

a third unidirectionally conducting circuit wherein said second commutating inductor causes current flow through the primary winding of said recoup transformer;

and a fourth unidirectionally conducting circuit wherein said primary and secondary windings cause current flow to said one commutating capacitor to charge the same.

PO-1050
(5/69)

UNITED STATES PATENT OFFICE
CERTIFICATE OF CORRECTION

Patent No. 3,609,511                    Dated January 28, 1972

Inventor(s) Robert L. Risberg

It is certified that error appears in the above-identified patent and that said Letters Patent are hereby corrected as shown below:

Column 2, line 19, after "circuit" remove --flows--
Column 4, line 56, change "off" to --of--
Column 5, line 14, after "voltage." insert --Blocking diode D4 traps this voltage on capacitor C9.--
Column 5, line 19, change "-cludes" to ---duces--
Column 5, line 20, change "reverses" to --reverse--
Column 6, line 50, change "delay" to --decay--
Column 6, line 57, insert "," after --SCR--

Signed and sealed this 6th day of June 1972.

(SEAL)
Attest:

EDWARD M. FLETCHER, JR.
Attesting Officer

ROBERT GOTTSCHALK
Commissioner of Patents